(12) United States Patent
Egawa et al.

(10) Patent No.: US 6,631,998 B2
(45) Date of Patent: Oct. 14, 2003

(54) SPREAD ILLUMINATING APPARATUS

(75) Inventors: Motoji Egawa, Iwata-gun (JP);
Takahiro Shimura, Iwata-gun (JP);
Shingo Suzuki, Iwata-gun (JP)

(73) Assignee: Minebea Co., Ltd., Nagano-Ken (JP)

(*) Notice: Subject to any disclaimer, the term of this patent is extended or adjusted under 35 U.S.C. 154(b) by 0 days.

(21) Appl. No.: 09/942,869

(22) Filed: Aug. 31, 2001

(65) Prior Publication Data

US 2002/0030986 A1 Mar. 14, 2002

(30) Foreign Application Priority Data

Sep. 5, 2000 (JP) ........................................ 2000-268517

(51) Int. Cl.$^7$ .............................. F21V 8/00; G01D 11/28
(52) U.S. Cl. ............................................ 362/31; 362/26
(58) Field of Search ............................. 362/31, 26, 330; 349/65; 385/129, 130, 901

(56) References Cited

U.S. PATENT DOCUMENTS

| 5,377,084 A | * | 12/1994 | Kojima et al. ................ 362/31 |
| 5,860,722 A | * | 1/1999 | Tai et al. ...................... 362/31 |
| 6,347,874 B1 | * | 2/2002 | Boyd et al. ................... 362/31 |

FOREIGN PATENT DOCUMENTS

| JP | A 2000-11723 | 1/2000 |

* cited by examiner

Primary Examiner—Y. My Quach-Lee

(57) ABSTRACT

A spread illuminating apparatus provides a uniform illuminance, an accurate illumination, an improved visibility, and an expanded screen size. Light sources (5a, 5b) comprising bar-like light conductive members (3a, 3b) and spot-like light sources (4a, 4b), respectively, are disposed close to end surfaces (8a, 8b) of a transparent substrate (2). A light reflection pattern (29) is formed on a surface of the transparent substrate (2) along the length of the light conductive members (3a, 3b). The light reflection pattern (29) comprises grooves (27) and flat portions (28) adjacent to the grooves. The grooves (27) are shaped trapezoidal in section, and the depth thereof increases in proportion to the increase in distance from the light sources (5a, 5b) and measures maximum at the center of the transparent substrate (2).

2 Claims, 6 Drawing Sheets

- LIGHT SOURCE SIDE     0°     TRAVELING DIRECTION +

(+)     0°     (−)

SPREAD ILLUMINATING APPARATUS

BACKGROUND OF THE INVENTION

1. Field of the Invention

The present invention relates to a spread illuminating apparatus, and more particularly to a spread illuminating apparatus used as an illuminating means for a liquid crystal display device.

2. Description of the Related Art

A liquid crystal display device, which is low in profile, small in occupied volume, and lightweight, has been extensively used in electric products including portable telephones and notebook computers. However, since the liquid crystal display device does not emit light by itself, it is necessary to provide a separate illuminating apparatus besides the liquid crystal display device when used in dark places where the brightness of the sunlight and the illumination in room is not fully available. Thus, the illuminating apparatus to irradiate liquid crystals is desired to be compact in size and small in power consumption, and in recent years, a low profile spread illuminating apparatus of side light system (the light conductive plate system) is often used. The inventors of the present invention proposed a conventional spread illuminating apparatus disclosed in the Japanese Unexamined Patent Application Publication No. 2000-11723.

FIG. 7 shows an embodiment of the conventional spread illuminating apparatus.

As shown in the figure, a spread illuminating apparatus 1' generally comprises a transparent substrate 2 made of a light-transmissible material, and a light source 5 provided close to an end surface 8 of the transparent substrate 2. Light emitted from the light source 5 is guided into the transparent substrate 2 to irradiate a liquid crystal display device (not shown in the figure) disposed on a lower side of the transparent substrate 2.

The light source 5 comprises a light conductive member 3 made of a transparent material and shaped bar-like, and a spot-like light source (for example, a light-emitting diode) 4 disposed on one end of the light conductive member 3. The light conductive member 3 is provided with an optical path conversion means 12. This optical path conversion means 12 is formed with grooves, for example triangular in section, provided on a surface of the light conductive member 3 opposite to a surface 9 facing an end surface 8 of the transparent substrate 2 and thereby has a function to allow light emitted from the spot-like light source 4 to be made incident substantially uniformly on the end surface 8 of the transparent substrate 2. The light conductive member 3 is disposed at a prescribed distance from the end surface 8 of the transparent substrate 2 with the surface 9 running parallel to the end surface 8.

In order to efficiently introduce the light emitted from the spot-like light source 4 into the transparent substrate 2, a light reflection member (frame) 13 is provided around the light conductive member 3. The light reflection member 13 is substantially U-shaped and covers the longitudinal periphery of the light conductive member 3 except the surface 9 facing the transparent substrate 2 (refer to FIG. 8). The light reflection member 13 may have a film on which a metal such as silver is vapor-deposited on its inner surface facing the light conductive member 3, or may be formed of a hard resin with a white film adhered to its inner surface, or a bent metal sheet such as an aluminum sheet, a stainless sheet and the like.

FIG. 8 is a schematic side view showing a light reflection pattern 19 formed on an upper surface 16 of the transparent substrate 2.

The light reflection pattern 19 comprises grooves 17 triangular in section and flat portions 18 adjacent thereto, which are formed at prescribed intervals therebetween in parallel to the light conductive member 3. The grooves 17 are formed to vary in depth from each other so that light coming from the light conductive member 3 and entering the transparent substrate 2 may be reflected in a substantially uniform manner at the whole surface of the transparent substrate 2 irrespective of the distance from the light conductive member 3 (the light source 5) to irradiate the liquid crystal display device (not shown in the figure) provided on the lower side of the transparent substrate 2. In other words, the depth of the grooves 17 increases gradually in proportion to the increase in distance from the light conductive member 3.

FIG. 9 shows another embodiment of a conventional spread illuminating apparatus.

As shown in the figure, a spread illuminating apparatus 1" comprises a plurality of light sources (5a and 5b) to cope with a larger display screen or to improve the brightness of the screen. The light source 5a is disposed along one end surface 8a of the transparent substrate 2, and the light source 5b is disposed along another end surface 8b opposite to the end surface 8a. Respective lights emitted from spot-like light sources 4a and 4b and entering light conductive members 3a and 3b are uniformly guided to the end surface 8a and the end surface 8b of the transparent substrate 2 by optical path conversion means 12a and 12b formed on one surface of the respective light conductive members 3a and 3b. In order to efficiently introduce the lights emitted from the spot-like light sources 4a and 4b into the transparent substrate 2, light reflection members (frames) 13a and 13b are provided around the light conductive members 3a and 3b, respectively. The light reflection members 13a and 13b are substantially U-shaped and cover the longitudinal peripheries of the light conductive members 3a and 3b except surfaces 9a and 9b facing the transparent substrate 2 (refer to FIG. 10).

FIG. 10 is a schematic side view showing a light reflection pattern 19 formed on an upper surface 16 of the transparent substrate 2.

The light reflection pattern 19 comprises grooves 17 triangular in section and flat portions 18 adjacent thereto, which are formed at prescribed intervals therebetween in parallel to the light conductive members 3a and 3b. The grooves 17 are formed to vary in depth from each other so that lights coming from the light conductive members 3a and 3b and entering the transparent substrate 2 may be reflected in a substantially uniform manner at the whole surface of the transparent substrate 2 irrespective of the distance from the light conductive members 3a and 3b (the light sources 5a and 5b) to irradiate the liquid crystal display device (not shown in the figure) provided on the lower side of the transparent substrate 2. In other words, the depth of the grooves 17 increases gradually in proportion to the increase in distance from the light conductive members 3a and 3b, and is largest at the center of the transparent substrate 2.

Since, in the spread illuminating apparatus of the above-described construction, the grooves (prisms) formed on the surface of the transparent substrate have a triangular shape in section, there is the disadvantage of the undermentioned restrictions in ensuring the visibility of the liquid crystal display image and the workability of the light reflection pattern.

FIG. 3B shows a path of light which is guided into the transparent substrate 2 and is reflected at the grooves 17 of the light reflection pattern 19 to irradiate the liquid crystal display device. When the groove interval L' between two adjacent grooves 17 of the light reflection pattern 19 is large, the difference in brightness between a light area irradiated with light reflected at the grooves and a dark area not irradiated with the light reflected at the grooves becomes conspicuous, whereby a liquid crystal display device 10 cannot be irradiated uniformly. And when the groove interval L' is set to be more than 0.3 mm, both the depth and width of the grooves 17 also increase to a certain degree, which causes the problem that the grooves 17 become visually recognizable when viewing the liquid crystal display screen. Therefore, the groove interval L' must be 0.3 mm or under (preferably, about 0.2 mm).

When the groove interval L' is set to be 0.3 mm and the depth of the grooves 17 is changed according to the distance from the light conductive member 3, the depth of the grooves 17 is set to range from about 10 $\mu$m to about 25 $\mu$m. When the depth of the grooves 17 exceeds 25 $\mu$m, the influence by an inclined surface of the grooves 17 emerges giving the problem that the liquid crystal display shows shifted images. Therefore, the maximum depth of the grooves 17 must be set about 20 to 25 $\mu$m.

When the groove interval L' is set to be 0.15 mm and the depth of the grooves 17 is changed according to the distance from the light conductive member 3, the depth of the grooves 17 is set to range from about 5 $\mu$m to about 15 $\mu$m. In addition, when the groove interval L' is further reduced, the minimum depth of the grooves 17 must be set 5 $\mu$m or under, otherwise the shape of the grooves cannot be precisely injection-molded.

Considering these restrictions on the workability, in case of a spread illumination apparatus of conventional construction, the dimension A (equal to the length of the transparent substrate in FIG. 7) of the liquid crystal display screen, through which a uniform illumination can be realized, is restricted to a specific value. For example, the dimension is about 60 mm in the spread illuminating apparatus having one light source disposed close to the transparent substrate 2, and about 120 mm in the spread illuminating apparatus having two light sources.

SUMMARY OF THE INVENTION

The present invention has been made in the light of the above problems. Accordingly, it is an object of the present invention to improve a light reflection pattern formed on a substrate, thereby providing a spread illuminating apparatus which can realize a uniform brightness over the whole display screen, an accurate illumination, and an expanded size of a practically usable screen.

In order to solve the above problems, according to a first aspect of the present invention, in a spread illuminating apparatus in which a bar-like light source is disposed close to and along two end surfaces opposing each other of a transparent substrate made of a light-transmissible material, and a light reflection pattern comprising a plurality of grooves and a plurality of flat portions adjacent thereto which are parallel to the length of the light source is formed on the transparent substrate, the grooves on the transparent substrate are substantially inverted-trapezoidal in section.

Light radiated from the light source is guided into the transparent substrate, reflected at inclined surfaces and bottom surfaces of the grooves and the flat portions which together form the light reflection pattern, and irradiates the liquid crystal display screen uniformly. The grooves trapezoidal in section can improve the machinability and durability of a die.

In order to solve the above problems, according to a second aspect of the present invention, in the spread illuminating apparatus according to the first aspect of the present invention, the exterior angle to the inclination angle formed by the inclined surface and the bottom surface of the grooves trapezoidal in section is 35° to 55°. Excellent characteristics of light distribution on an observation screen can be obtained by setting the inclination angle of the inclined surface of the groove forming the light reflection pattern to a prescribed value.

In order to solve the above problems, according to a third aspect of the present invention, in the spread illuminating apparatus according to the second aspect of the present invention, the angles are formed bilaterally symmetric. More excellent characteristics of light distribution can be obtained by making the inclination angles of the right and left inclined surfaces of the grooves bilaterally symmetric.

In order to solve the above problems, according to a fourth aspect of the present invention, in the spread illuminating apparatus according to any one of the first to third aspects of the present invention, the depth of the grooves constituting the light reflection pattern increases in proportion to the increase in distance from the respective light sources, and is largest at the center of the transparent substrate. Still more excellent characteristics of light distribution can be obtained by changing the depth of the grooves of the light reflection pattern.

In order to solve the above problems, according to a fifth aspect of the present invention, in the spread illuminating apparatus according to any one of the first to third aspects of the present invention, the interval between the adjacent grooves constituting the light reflection pattern is in inverse proportion to the increase in distance from the respective light sources and decreases toward the center of the transparent substrate to measure minimum thereat.

DESCRIPTION OF THE PREFERRED EMBODIMENTS

Figure 1:
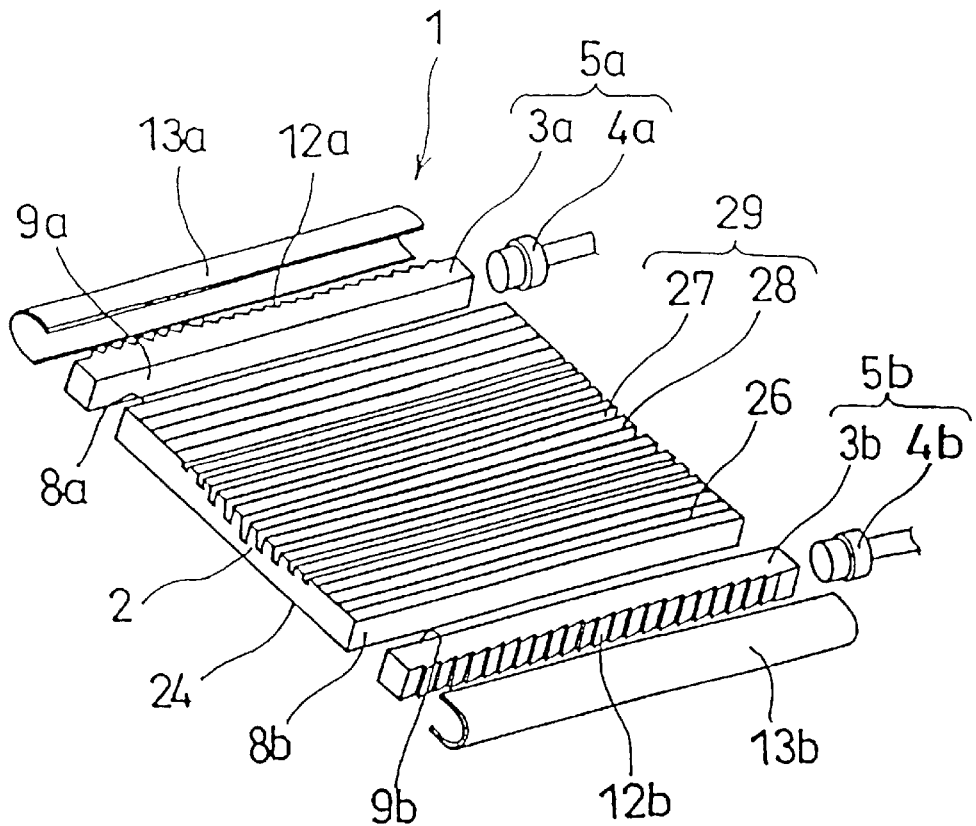
FIG. 1 is an exploded perspective view of an embodiment of a spread illuminating apparatus in accordance with the present invention.

Preferred embodiments of the spread illuminating apparatus according to the present invention are hereinafter explained referring to the attached drawings. The spread illuminating apparatus of the present invention is realized by improving the light reflection pattern formed on the transparent substrate of the spread illuminating apparatus explained as a conventional example, more specifically, improving the shape of the grooves to constitute the light reflection pattern. The components identical with or corresponding to those in the conventional spread illuminating apparatus are represented by the same reference numerals and the detailed description thereof is omitted.

FIG. 1 is an exploded perspective view showing an embodiment of the spread illuminating apparatus in accordance with the present invention. As shown in the figure, a spread illuminating apparatus 1 generally comprises a transparent substrate 2, light sources 5a and 5b disposed along end surfaces 8a and 8b of the transparent substrate 2, and light reflection members (frames) 13a and 13b. The light sources 5a and 5b comprise bar-like light conductive members 3a and 3b and spot-like light sources 4a and 4b, respectively, and optical path conversion means 12a and 12b are formed on one surface of the respective light conductive members 3a and 3b. The light reflection members 13a and 13b are disposed so as to cover the light conductive members 3a and 3b, respectively, when the spread illuminating apparatus 1 is assembled (refer to FIG. 2).

In this embodiment, a light source comprising a spot-like light source and a bar-like (straight) light conductive member is used, but the present invention is not limited to this embodiment and a fluorescent lamp or the like may be used.

A light reflection pattern 29 is formed on an upper surface (observation side) 26 of the transparent substrate 2 in order to uniformly emit light, which is guided into the transparent substrate 2 through the end surfaces 8a and 8b (hereinafter, referred to also as "incident surfaces"), toward a liquid crystal display device (not shown in the figure) from the whole part of a lower surface 24 of the transparent substrate 2. The light reflection pattern 29 comprises grooves 27 and flat portions 28 adjacent to the grooves, which are formed along the length of the light conductive members 3a and 3b. The grooves 27 are shaped substantially like an inverted trapezoid in section. In other words, in FIG. 2 all the grooves are each supposed to have a shorter side at their bottom (toward the lower surface 24) and a longer side toward the upper surface 26. The depth of the grooves 27 increases in proportion to the increase in distance from the respective light conductive members 3a and 3b. That is, any adjacent grooves 27 differ in depth from each other. The depth of the grooves 27 is smallest next to the respective light conductive members 3a and 3b, increases gradually toward the center of the transparent substrate 2 and is largest thereat.

Figure 2:
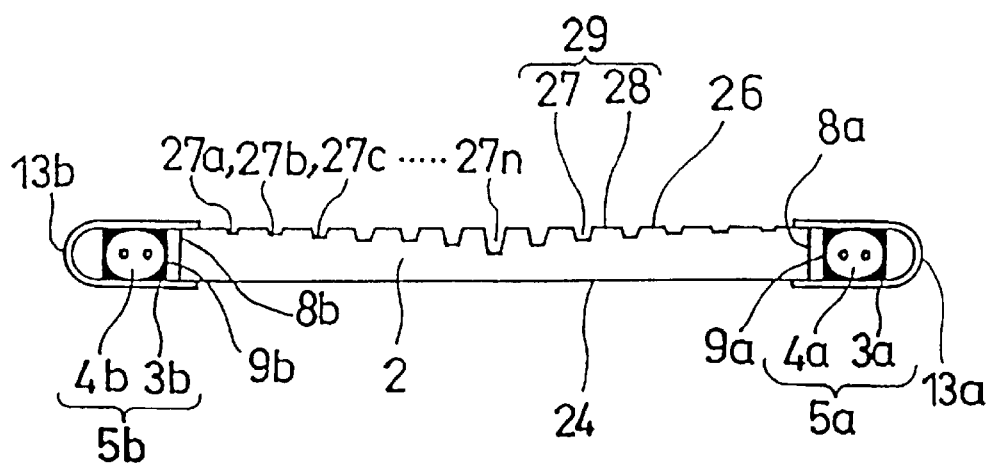
FIG. 2 is a side view of a light reflection pattern formed on a transparent substrate of the spread illuminating apparatus shown in FIG. 1.

FIG. 2 is a schematic side view of the light reflection pattern 29 formed on the upper surface 26 of the transparent substrate 2. Among grooves 27a, 27b . . . and 27n, the groove 27a which is closest to the light conductive member 3b has a smallest depth, and the depth of the grooves 27 increases in proportion to the increase in distance (the groove 27b, the groove 27c . . . ) from the light conductive member 3b, and thus the groove 27n formed at the center of the transparent substrate 2 has a largest depth.

The reasons why light can be uniformly emitted by changing the depth of the grooves 27 according to the distance from the light conductive members 3a and 3b are as follows:

Light emitted from the light source 5b and guided into the transparent substrate 2 through the incident surface 8b of the transparent substrate 2 is reflected at inclined surfaces and bottom surfaces of the grooves 27a, 27b, . . . and 27n or the flat portions both forming the light reflection patterns 29. Most of the light reflected at the inclined surfaces of the grooves 27a, 27b, . . . and 27n goes out of the transparent substrate 2 passing the lower surface 24 because the incident angle (relative to the lower surface 24) of the light traveling toward the lower surface 24 is small. On the other hand, most of the light reflected at the bottom surfaces of the grooves and the flat portions is reflected at the lower surface 24 and stays in the transparent substrate 2 because the incident angle of the light traveling toward the lower surface 24 is large. Thus, the quantity of the light emitted from the lower surface 24 of the transparent substrate 2 increases in proportion to the increase in area of the inclined surface of the grooves. The brightness of the light is in inverse proportion to the increase in distance from the light source 5b. In conclusion, in the embodiment shown in FIG. 2, the light reflection pattern 29 is formed such that the depth of the grooves increases to thereby increase the area of the inclined surface in proportion to the increase in distance from the light source 5b to make a balance with the light dependent on the distance from the light source 5b, whereby the light is uniformly emitted from the whole lower surface 24 of the transparent substrate 2. And the light reflection pattern 29 acts on light emitted from the light source 5a in the same manner.

Figure 4A:
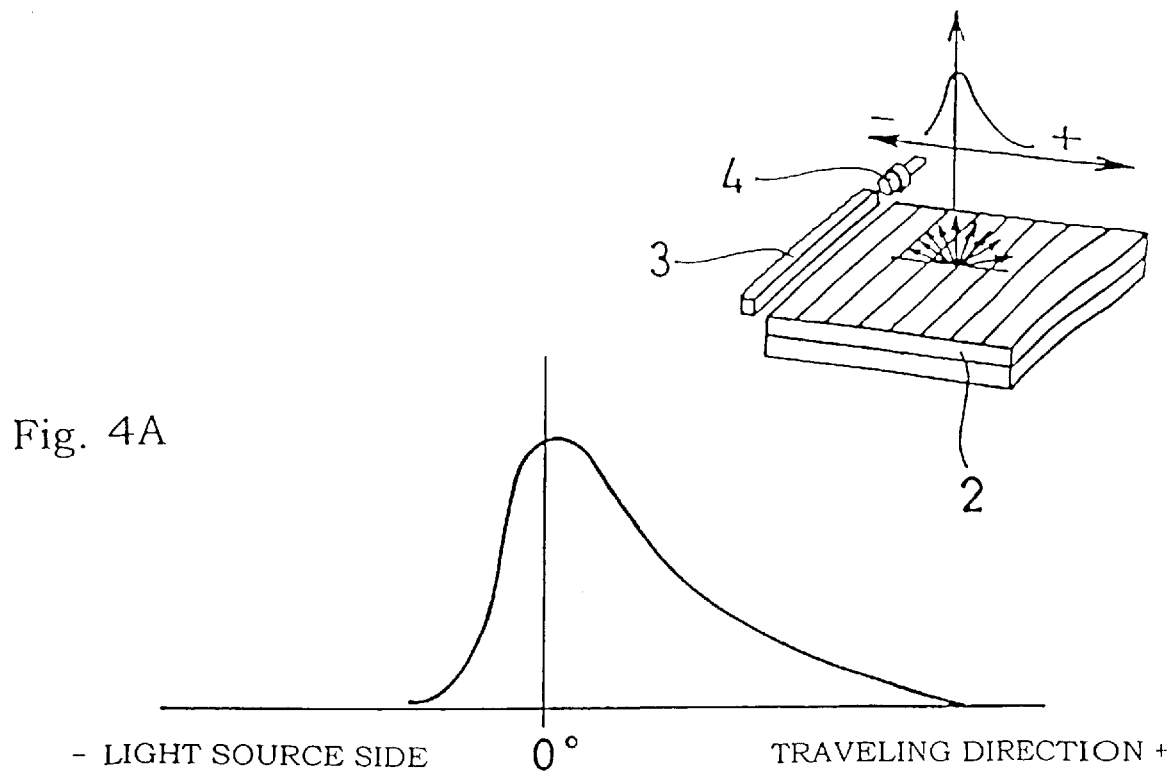
FIG. 4A is a view showing the angular distribution of light on an observation surface when one light source is disposed.
Figure 4B:
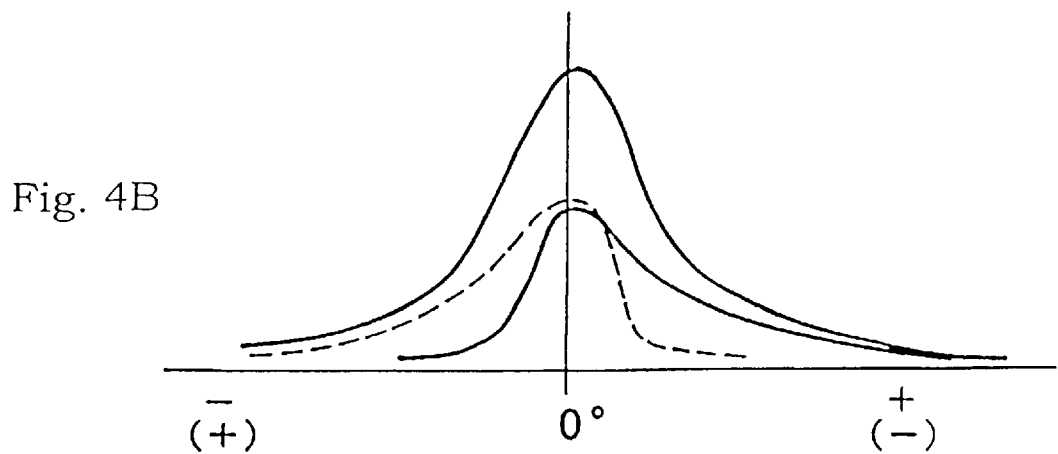
FIG. 4B is a view showing the angular distribution of light on an observation surface when two light sources are disposed.

Here, the relationship between the light source and the light distribution viewed from the observation surface is explained. FIG. 4 shows the angular distribution of the light in viewing the observation surface from a specific direction. FIG. 4A shows a graph of the angular distribution and the observed image thereof when one light source is provided. FIG. 4B shows a graph of the angular distribution when two light sources are provided. The plus (+) side of the graph indicates the traveling direction side of the light, and the minus (−) side indicates the light source side.

As shown in FIG. 4A, light is emitted in an extensive range (angle) in the traveling direction side thereof. On the other hand, light is emitted only in a narrow range (angle) on the light source side. This indicates that light is not easily emitted in the returning direction. The improved view angle by making use of this characteristic of the angular distribution is embodied in an illuminating apparatus having one light source on both ends of the transparent substrate, i.e., two light sources on the transparent substrate. FIG. 4B shows the angular distribution of light in such illuminating apparatus. Lights coming in the transparent substrate from both ends thereof are synthesized to be emitted in an extensive range (angle) onto the plus side and the minus side to obtain a wide view angle.

Next, light-and-dark stripes generated on the observation surface due to the difference in reflection of light at the light reflection pattern are explained.

Figure 3A:
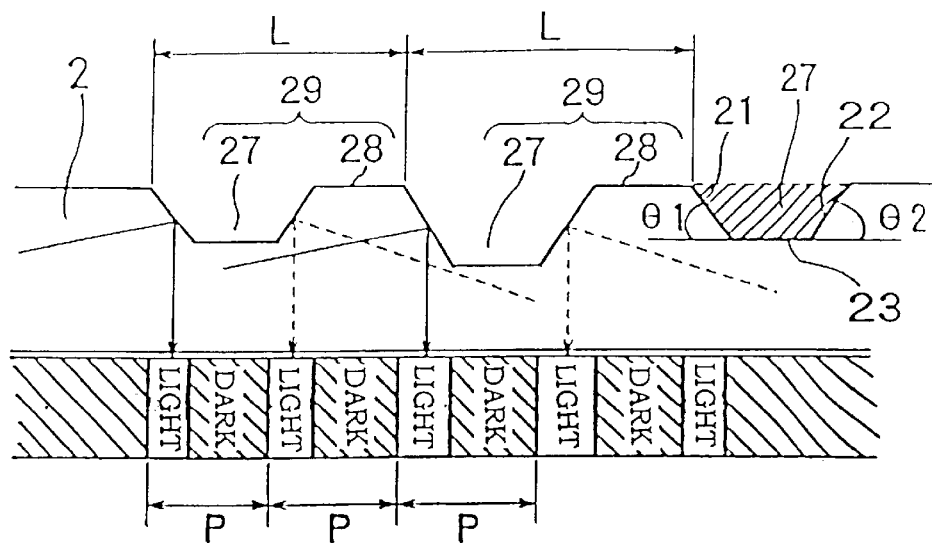
FIG. 3A is a schematic representation of light-and-dark stripes generated by the light reflection pattern in accordance with the present invention.
Figure 3B:
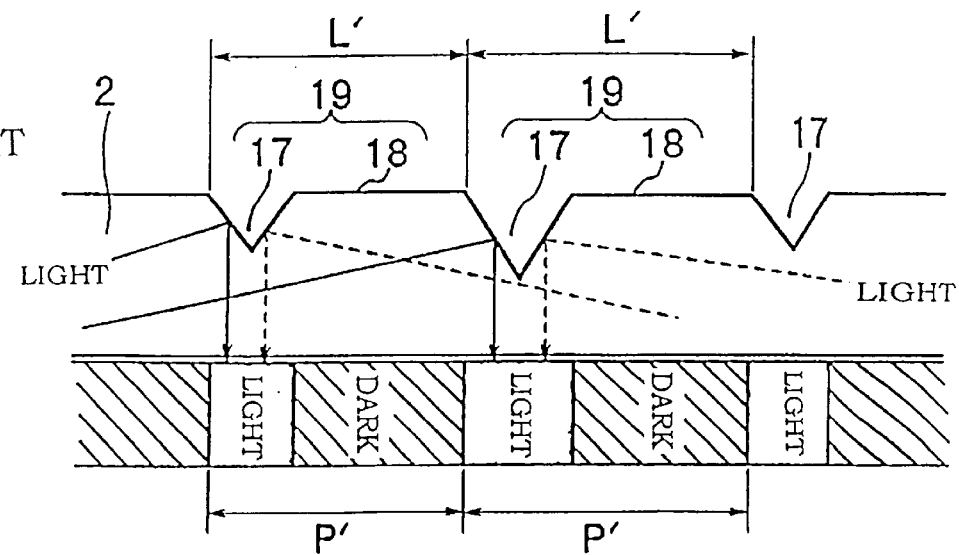
FIG. 3B is a schematic representation of light-and-dark stripes generated by a conventional light reflection pattern.

FIGS. 3A and 3B are schematic representations of the light-and-dark stripes generated by light reflected at the light reflection patterns 29 and 19, respectively, formed on the transparent substrate 2. FIG. 3A shows the light-and-dark stripes (an embodiment of the present invention) generated when the grooves 27 constituting the light reflection pattern 29 are formed trapezoidal in section, and FIG. 3B shows the light-and-dark stripes (an embodiment of a conventional example) generated when grooves 17 constituting the light reflection pattern 19 are formed triangular in section.

In both embodiments, light portions of the light-and-dark stripes are generated through the irradiation by light rays reflected at the inclined surfaces of the grooves 27 and the grooves 17. Although the groove interval L (the interval between two grooves adjacent to each other) is equal to the groove interval L' of the conventional embodiment, the light-and-dark stripe interval P shown in FIG. 3A is about one half of the conventional light-and-dark stripe interval P' shown in FIG. 3B. This is because in the present invention one light portion is generated individually by one light ray reflected at each separate inclined surface of the grooves 27 trapezoidal in section shown in FIG. 3A while in the conventional art one light portion is generated combinedly by two light rays reflected at two joining inclined surfaces of the grooves 17 triangular in section shown in FIG. 3B. Thus, in the present invention the difference between the light and the dark portions is less conspicuous, and the illumination quality is improved. When the transparent substrate 2 is formed with the light-and-dark stripe interval P equal to the conventional light-and-dark stripe interval P', the groove interval L is substantially doubled, and the screen size capable of the illumination quality of the same level as the conventional art can be substantially doubled.

The inclination angle of the inclined surface of the grooves 27 on the light reflection pattern 29 to efficiently reflect light will be explained. In the groove 27 of a trapezoidal configuration hatched in FIG. 3A, the angle fanned by the inclined surface 21 and a datum line extending in both directions from the bottom surface 23 in parallel therewith, is defined as θ1, and the angle formed by the inclined surface 22 and the datum line is defined as θ2. The angles θ1 and θ2 are set so that light can be totally reflected at the inclined surfaces 21 and 22. In addition, the angles are limitedly specified so as to make the observation screen lightest. Considering these factors, light can be reflected in the most efficient manner when both the angle θ1 and the angle θ2 are set at 45° in the case of the flat plate-like transparent substrate 2 described in this embodiment. However, the angles θ1 and θ2 should be appropriately set according to the shape of the transparent substrate and the purpose of application and accordingly are to be set in a range of 35° to 55°.

Figure 5:
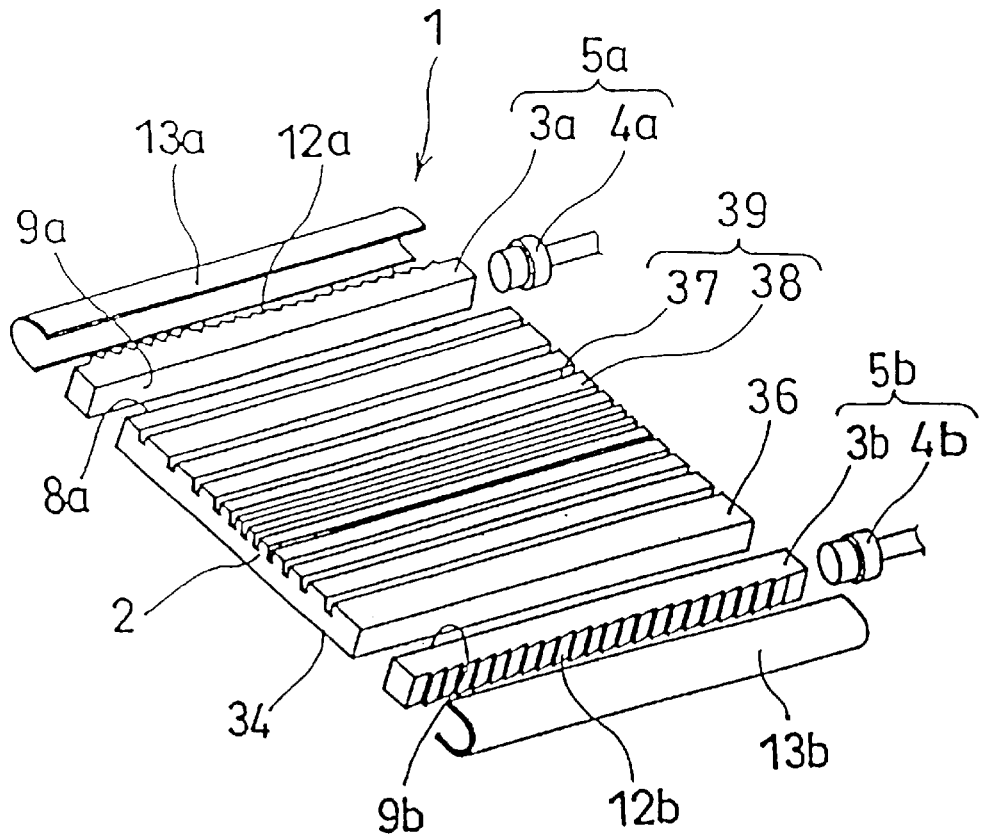
FIG. 5 is an exploded perspective view of another embodiment of the spread illuminating apparatus in accordance with the present invention.

FIG. 5 is an exploded perspective view of another embodiment of the spread illuminating apparatus of the present invention.

A light reflection pattern 39 comprising grooves 37 inverted-trapezoidal in section and flat portions 38 adjacent to the grooves, both parallel to the length of the light conductive members 3a and 3b, is formed on an upper surface 36 of the transparent substrate 2. The depth and the bottom width of the grooves 37 are formed constant. The width of the flat portions 38 is in inverse proportion to the increase in distance from the respective light sources 5a and 5b. This means that the flat portions 38 are different in width from each other and that the width of the flat portions 38 decreases from the respective light conductive members 3a and 3b toward the center of the transparent substrate 2 to measure minimum at the center. Since the number of the grooves in a fixed distance increases gradually in proportion to the increase in distance from the light sources 5a and 5b by changing the width of the flat portions to constitute the light reflection pattern 39, the quantity of light attributable to the reflection at the grooves 37 is balanced with the quantity of light dependent on the distance from the light sources 5a and 5b, whereby light is emitted uniformly from the whole lower surface 34.

Figure 6:
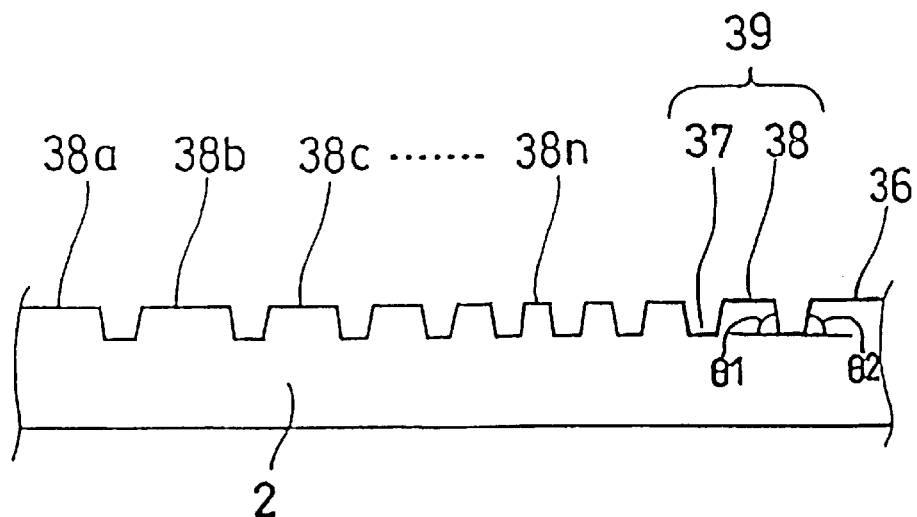
FIG. 6 is a side view showing the light reflection pattern formed on the transparent substrate of the spread illuminating apparatus shown in FIG. 5.
Figure 7:
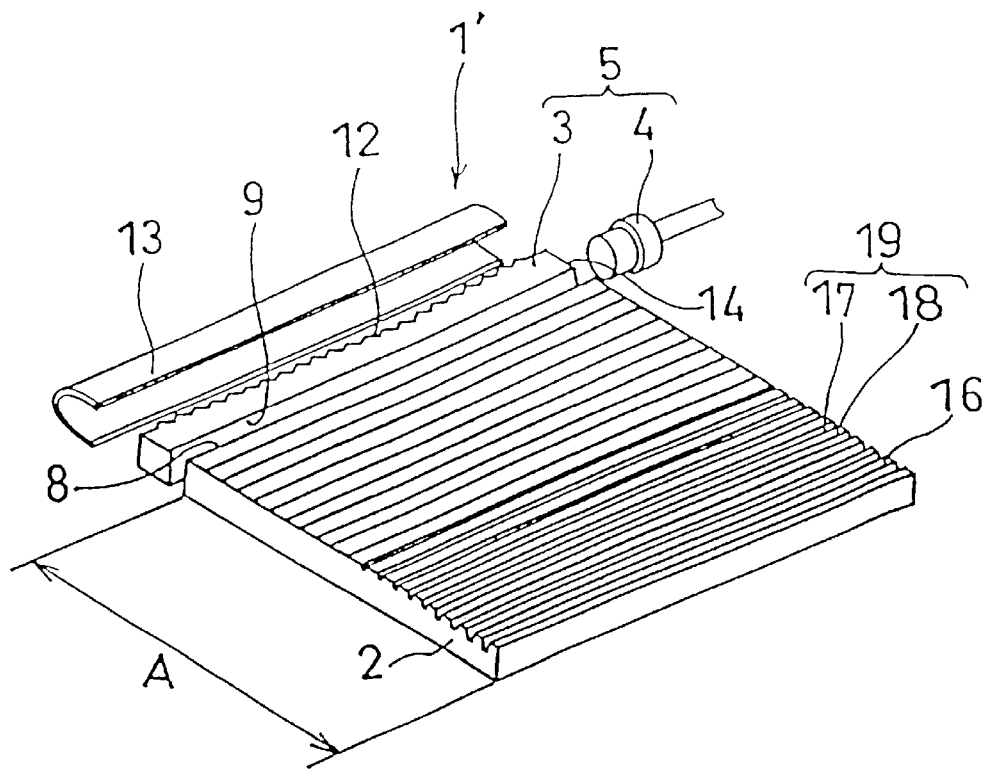
FIG. 7 is an exploded perspective view showing an embodiment of a conventional spread illuminating apparatus.
Figure 8:
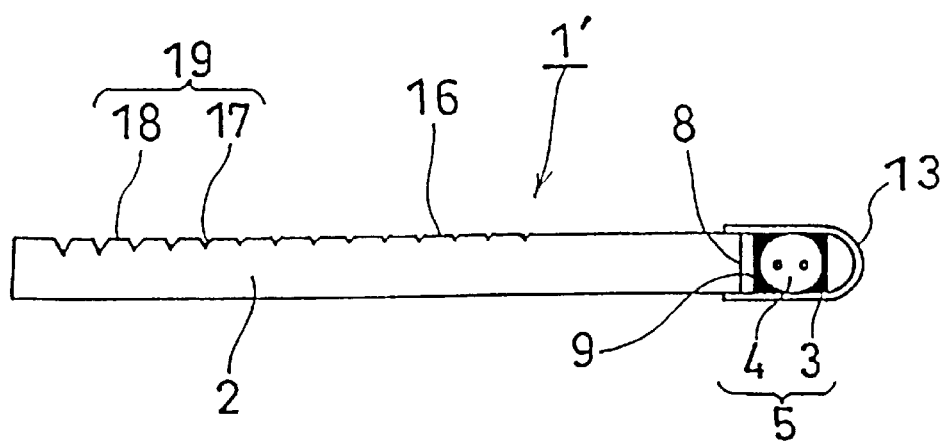
FIG. 8 is a side view showing the light reflection pattern formed on the transparent substrate of the spread illuminating apparatus shown in FIG. 7.
Figure 9:
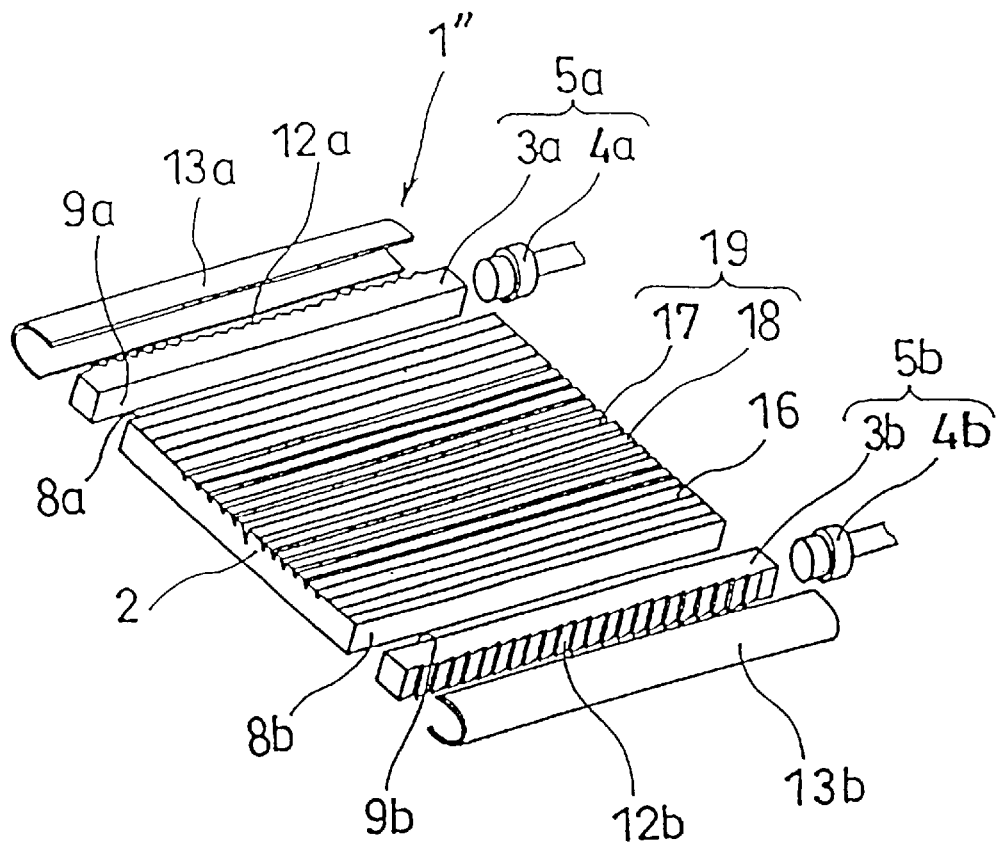
FIG. 9 is an exploded perspective view showing another embodiment of a conventional spread illuminating apparatus.
Figure 10:
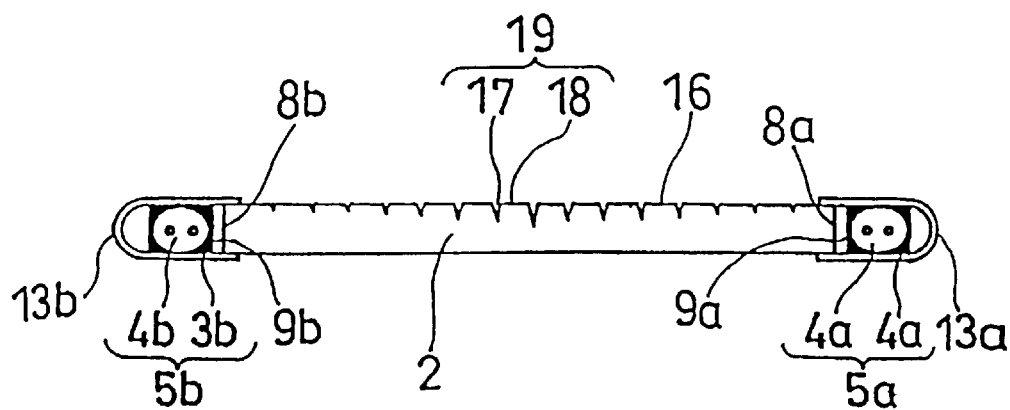
FIG. 10 is a side view showing the light reflection pattern formed on the transparent substrate of the spread illuminating apparatus shown in FIG. 9.

FIG. 6 is an enlarged schematic side view showing the light reflection patter 39 formed on the upper surface 36 of the transparent substrate 2 with the light conductive member 3b toward the left side. Among the flat portions 38a, 38b . . . and 38n, the flat portion 38a which is closest to the light conductive member 3b has a largest width, and the width is in inverse proportion to the increase in distance from the light conductive member 3b (the flat portion 38b, the flat portion 38c . . . and decreases gradually toward the center of the transparent substrate 2, and the flat portion 38n formed at the center has a smallest width.

The inclination angles of the inclined surfaces forming the grooves are equal to the angles θ1 and θ2 explained in FIG. 3.

In the spread illuminating apparatus in accordance with the present invention where grooves of a light reflection pattern formed on a transparent substrate are shaped trapezoidal in section, when the light reflection pattern is formed with groove intervals same as in a conventional art, the groove intervals practically compare to the light-and-dark stripe intervals attributable to the difference in reflection of light between at the inclined surfaces of the grooves and at the bottom surfaces of the grooves and the flat portions and therefore can be considered to be approximately one half of the groove intervals applied in the conventional art, and the unevenness in brightness recognizable on the observation surface can be reduced. Accordingly, when the light-and-dark stripe intervals (practically regarded as the groove intervals) are approximately doubled in the present invention, the screen quality of the same level as in the conventional art can be kept, whereby a larger display screen can be obtained while maintaining the same screen quality.

Since a die for the transparent substrate has no acute projection, the durability thereof improves considerably.

Light to irradiate liquid crystal display elements can be uniformly spread over the whole transparent substrate by appropriately changing the depth of the grooves and the width of flat portions of the light reflection pattern according to the distance from the light source. Further, light guided into the transparent substrate can be efficiently emitted from the lower surface of the transparent substrate by predeterminedly setting the inclination angle of the inclined surfaces forming the grooves.

What is claimed is:

1. A spread illuminating apparatus of side light system, comprising:

at least one bar-like light source disposed close to and along each of two end surfaces opposing each other of a transparent substrate made of a light-transmissible material; and a light reflection pattern formed on said transparent substrate, and comprising a plurality of grooves shaped substantially inverted-trapezoidal in section such that angles formed by respective inclined surfaces and a datum line extending in both directions from and in parallel with a bottom surface of said groove range from 35° to 55° and are bilaterally symmetric to each other, and a plurality of flat portions adjacent respectively to the grooves, both the grooves and the flat portions running parallel to the length of said at least one light source;

wherein a depth of said grooves constituting said light reflection pattern increases in proportion to the increase in distance from each of said at least one light source, and measures maximum at the center of said transparent substrate.

2. A spread illuminating apparatus of side light system, comprising:

at least one bar-like light source disposed close to and along each of two end surfaces opposing each other of a transparent substrate made of a light-transmissible material; and a light reflection pattern formed on said transparent substrate, and comprising a plurality of grooves shaped substantially inverted-trapezoidal in section such that angles formed by respective inclined surfaces and a datum line extending in both direction from and in parallel with a bottom surface of said groove range from 35° to 55° and are bilaterally symmetric to each other, and a plurality of flat portions adjacent respectively to the grooves, both the grooves and the flat portions running parallel to the length of said at least one light source, wherein an interval between said grooves constituting said light reflection pattern is in inverse proportion to the increase in distance from each of said at least one source, and decreases toward the center of said transparent substrate to measure minimum thereat.

* * * * *